(12) United States Patent
Chamberlain et al.

(10) Patent No.: US 11,420,707 B2
(45) Date of Patent: *Aug. 23, 2022

(54) ADJUSTABLE BICYCLE SUSPENSION

(71) Applicant: SPECIALIZED BICYCLE COMPONENTS HOLDING COMPANY, INC., Morgan Hill, CA (US)

(72) Inventors: Jason L. Chamberlain, Morgan Hill, CA (US); Jason McDonald, Morgan Hill, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/105,063

(22) Filed: Nov. 25, 2020

(65) Prior Publication Data

US 2021/0078669 A1    Mar. 18, 2021

Related U.S. Application Data

(63) Continuation of application No. 15/946,520, filed on Apr. 5, 2018, now Pat. No. 10,850,799.

(51) Int. Cl.
*B62K 25/28* (2006.01)
*B62K 3/02* (2006.01)
*B62K 25/04* (2006.01)

(52) U.S. Cl.
CPC ................ *B62K 25/28* (2013.01); *B62K 3/02* (2013.01); *B62K 2025/041* (2013.01); *B62K 2201/04* (2013.01)

(58) Field of Classification Search
CPC .. B62K 25/28; B62K 25/286; B62K 2201/04; B62K 2025/04; B62K 2025/045; B62K 2025/048; F16F 9/54; F16F 9/56; B60G 13/001
USPC ............. 280/284; 411/398; 74/571.1, 571.11
See application file for complete search history.

(56) References Cited

U.S. PATENT DOCUMENTS

| | | | |
|---|---|---|---|
| 1,044,055 A | 11/1912 | Johnson et al. | |
| 1,213,599 A | 1/1917 | Dow | |
| 3,006,443 A * | 10/1961 | Siler ...................... | F16B 43/00 403/408.1 |
| 3,408,924 A | 11/1968 | Mueller | |
| 3,747,168 A | 7/1973 | Snarskis et al. | |

(Continued)

FOREIGN PATENT DOCUMENTS

| | | |
|---|---|---|
| CN | 2092488 U | 1/1992 |
| DE | 102015106905 | 6/2017 |

(Continued)

*Primary Examiner* — Anne Marie M Boehler
(74) *Attorney, Agent, or Firm* — Knobbe, Martens, Olson & Bear, LLP

(57) ABSTRACT

A bicycle assembly can include a bicycle frame having a main frame and a sub-frame, and a shock absorber assembly. The shock absorber assembly can comprise a shock absorber and an extension body. The sub-frame can rotate in relation to the main frame and the shock absorber assembly can be used to regulate that relationship. An eccentric insert positioned functionally between the shock absorber and extension body can be used to modify the overall length of the shock absorber assembly to beneficially alter the geometry of the bicycle frame.

11 Claims, 12 Drawing Sheets

(56) References Cited

U.S. PATENT DOCUMENTS

| | | | |
|---|---|---|---|
| 5,580,201 A * | 12/1996 | Brilmyer | B62D 17/00 |
| | | | 411/169 |
| 6,877,591 B1 | 4/2005 | Hso et al. | |
| 6,895,834 B1 | 5/2005 | Baatz | |
| 7,726,927 B2 | 6/2010 | Cook et al. | |
| 8,006,993 B1 | 8/2011 | Chamberlain | |
| 8,430,415 B2 | 4/2013 | Earle | |
| 8,931,794 B2 | 1/2015 | O'Connor | |
| 9,021,902 B2 | 5/2015 | Chu et al. | |
| 9,534,624 B2 | 1/2017 | Rautionmaa et al. | |
| 10,850,799 B2 * | 12/2020 | Chamberlain | B62K 25/28 |
| 2010/0225089 A1 * | 9/2010 | Chamberlain | B62K 25/286 |
| | | | 280/275 |
| 2015/0014498 A1 | 1/2015 | Hock | |
| 2020/0124131 A1 | 4/2020 | Fillep et al. | |

FOREIGN PATENT DOCUMENTS

| | | |
|---|---|---|
| JP | 3548270 | 7/2004 |
| JP | 2013204798 | 10/2013 |

* cited by examiner

ADJUSTABLE BICYCLE SUSPENSION

CROSS REFERENCE TO RELATED APPLICATIONS

This application is a continuation of co-pending U.S. patent application Ser. No. 15/946,520, filed Apr. 5, 2018, the entirety of which is hereby incorporated by reference herein.

BACKGROUND

Field

The present technology relates generally to bicycle suspension systems and frame assemblies. In particular, the present technology relates to configurations for rear suspension assemblies and mounting arrangements for rear suspension assemblies suitable for use in connection with bicycles, including off-road bicycles.

Related Art

Off-road bicycles, or mountain bikes, may be equipped with front and rear suspension assemblies operably positioned between the frame of the bicycle and the front and rear wheels, respectively. Providing front and rear suspension on a bicycle potentially improves handling and performance by absorbing bumps and other rough trail conditions, which may be encountered while riding off-road. However, because mountain bikes are typically pedal-driven, i.e., use the rider's power output to propel the bicycle, the provision of rear suspension, especially, may undesirably absorb a rider's power output, resulting in wasted effort.

In addition, because a mountain bike is propelled solely by power output from the rider, it is desirable that the rear suspension assembly be lightweight. Mountain bike rear suspension designs, utilizing multiple linkage members, are currently used and are often effective at isolating pedal-induced and brake-induced forces from acting on the rear suspension.

SUMMARY

One problem associated with prior mountain bike rear suspension designs involves placement of the rear shock absorber. Due to the relatively complex nature of common mountain bike rear suspension assemblies, the rear shock absorber cannot always be placed in an optimal position for absorbing shocks, dampening vibrations, and preventing pedal-induced and brake-induced forces from acting on the rear suspension. Thus, there exists a continuing need to develop new configurations for the placement and mounting of rear suspensions on bicycle frames. Further, different riders may prefer that a bicycle suspension system be configured differently, and/or different riding terrain may lead to certain suspension system configurations being more desirable than others. Thus, there is a need to enable riders to adjust the configuration or geometry of a bicycle suspension system.

One aspect of the present disclosure is a convenient way to alter the head angle (and/or other suspension geometry) of a bicycle frame. Adjustment of the length of the shock absorber assembly (i.e., the shock absorber and its related mounting equipment) can soften (decrease) or steepen (increase) the head angle formed between the bicycle frame (i.e., a centerline between the front and rear wheels) and a head tube of the front wheel. A steeper head angle makes steering the bicycle easier and faster, while a lower head angle provides for more stable steering. Thus, adjustment of the head angle can have significant impact on the performance characteristics of any bicycle.

Another aspect of the present disclosure is a shock absorber assembly that can be adjustable in its overall length. For example, an eccentric insert (which may also be referred to herein as a spacer, bushing, collar, and/or the like) can be included between a shock absorber and an extension body. The eccentric insert can be assembled in at least two positions. One position can shorten the overall length of the shock absorber assembly and the other position can lengthen the overall length.

Another aspect of the present disclosure is that the eccentric insert can be disposed in an eyelet of the shock absorber and a pin can be inserted through the eccentric insert to couple the extension body with the shock absorber. An outer surface of the eccentric insert can be generally centered or aligned within the eyelet and the pin can be offset from a center of the outer surface of the eccentric insert. The offset can be in a direction that shortens the overall length of the shock absorber assembly in the first position and lengthens the overall length of the shock absorber assembly in the second position. The first and second positions of the eccentric insert can be 180 degrees apart.

Another aspect of the present disclosure is a base of the eccentric insert that prevents rotation when assembly with the extension body. Existing inserts can couple together extension bodies and shock absorbers but do not reliably maintain their positions. For example, the inserts can rotate within the eyelet of the shock absorber during use. Thus, according to some aspects of the disclosure, the eccentric insert includes at least one base having at least one edge that can be received within at least one channel of the extension body. The at least one channel can include multiple sides. At least one of the sides can be directly engaged with the at least one edge of the at least one base to keep the eccentric insert aligned when assembled with the extension body. For example, the at least one base can be rectangular, parallelogram, square, triangular, hexagonal or any other suitable shape, or include at least one straight side and the at least one channel can have one or more straight sides that engage the at least one straight side when assembled together. In other examples, the edge(s) of the base(s) and the side(s) of the channel(s) are not straight (e.g., curved or include other geometric patterns). Nevertheless, the edges(s) and side(s) correspond such that they can be fittingly engaged to prevent rotation of the eccentric insert when assembled into the extension body. In one implementation, a front and back edge of the base of the eccentric insert engages with a back side of the channel when in the first and second positions, respectively.

Another aspect of the present disclosure is that the eccentric insert can include upper and lower portions or shock couplers. The upper and lower shock couplers facilitate assembly of the eccentric insert within the eyelet of the shock absorber. The shock couplers can be identical in some implementations, but may not be identical in some implementations. In some embodiments, the upper and lower shock couplers can have an angled face where the angled faces must be aligned to assemble the upper and lower shock couplers to form the eccentric insert. By requiring a specific orientation (e.g., alignment of the angled faces) for assembly, some embodiments of the upper and lower shock couplers can only be assembled together in the correct orientation. Although some embodiments disclosed herein utilize corresponding angled faces to force assembly of the upper and lower shock couplers in only one relative arrangement, other features may be used to perform such a function. For example, one of the upper or lower shock couplers may comprise one or more protruding members that are configured to be at least partially received within one or more corresponding recesses of the other of the upper or lower shock couplers when assembled in the correct relative arrangement. In some embodiments, such features may be referred to as anti-rotate features, clocking features, indexing features, and/or the like.

According to one aspect of a bicycle assembly disclosed herein, a bicycle assembly includes a mainframe and a sub-frame. The mainframe can include a seat tube, head tube and an intermediate tube connection between the seat tube and the head tube. The sub-frame can rotate with respect to the mainframe about one or more pivot points. The sub-frame defines a location for mounting a rear wheel. A suspension assembly can control the rotation of the sub-frame with respect to the mainframe about the one or more pivot points. The suspension assembly can have a shock absorber assembly comprising a shock absorber attached to an extension body. The shock absorber can have a first end that is connected to the mainframe and a second end that attaches with the extension body. The first end can couple with the main frame and the second end can include an eyelet and define a first suspension assembly pivot axis.

The extension body can be connected with the second end of the shock absorber at the second eyelet. The extension body can include a pair of extension arms, each extension arm connected to the sub-frame and connected to the sub-frame and defining a second suspension assembly pivot axis. The connection between the extension body and shock absorber can include an eccentric insert coupled between the shock absorber and the extension body. The eccentric insert can include a cylindrical body at least partially disposed within the eyelet of the shock absorber. A pin aperture can extend through the cylindrical body and through a portion of the extension body. An axis of the pin aperture can be offset from an axis of the cylindrical body of the eccentric insert.

The eccentric insert can be assembled with the eccentric body in at least two positions, enabling adjustment of an overall length of the shock absorber assembly. The eccentric insert can fit within the extension body within a channel in both assembled positions. A base portion of the eccentric insert is inserted within the channel. The channel can align and maintain the orientation of the eccentric insert with respect to the extension body. A first assembled position of the eccentric insert corresponds to a first overall length of the shock absorber and the extension body. A second assembled position of the eccentric insert within the extension body corresponds to a second overall length of the shock absorber and the extension body.

According to one aspect of a bicycle assembly disclosed herein, the bicycle assembly includes a main frame with a seat tube, a head tube, and an intermediate tube connects the seat tube and the head tube. A sub-frame rotates with respect to the main frame. A suspension assembly controls rotation of the sub-frame with respect to the main frame. The suspension assembly has a shock absorber. The shock absorber has first and second opposing ends and first and second eyelets at each end. The first eyelet at the first end connects to the main frame. An extension body has a first end connected to the shock absorber at the second eyelet and a second end with a pair of extension arms connected to the sub-frame. An eccentric insert couples between the shock absorber and the extension body. The eccentric insert has a cylindrical body at least partially disposed within the second eyelet of the shock absorber and a pin aperture disposed through the cylindrical body. An axis of the pin aperture is offset from an axis of the cylindrical body. A pin couples the extension body and the shock absorber. The pin extends through an aperture of the extension body, the pin aperture of the eccentric insert and the second eyelet of the shock absorber. The eccentric insert includes a base and the extension body includes a channel shaped to receive at least a portion of the base. The suspension assembly includes a first assembled configuration corresponding to a first overall length of the shock absorber and extension body in which the axis of the cylindrical body is offset in a first direction relative to the extension body. The suspension assembly includes a second assembled configuration corresponds to a second overall length of the shock absorber and extension body in which the axis of the cylindrical body is offset in a second direction opposite the first direction relative to the extension body.

According to another aspect of the bicycle assembly, the eccentric insert includes an upper shock coupler and a lower shock coupler. The upper shock coupler has the base and at least a portion of the cylindrical body. The lower shock coupler has a second base and at least a portion of the cylindrical body. The pin aperture extends through both the upper and lower shock couplers.

According to another aspect of the bicycle assembly, the extension body includes an upper deck and a lower deck. The channel is disposed in the upper deck and a second channel is disposed in the lower deck. The upper and lower shock couplers insert between the upper and lower decks within the channels.

According to another aspect of the bicycle assembly, the upper and lower shock couplers are shaped such that they can only be assembled together in one arrangement relative to one another when the upper and lower shock couplers are assembled to the shock absorber with the bases in contact with the second eyelet of the shock absorber.

According to another aspect of the bicycle assembly, the upper and lower shock couplers each include a corresponding angled surface and the eccentric insert is insertable within the channel disposed in the upper deck and the second channel disposed in the lower deck of the extension body with the corresponds angled surfaces aligned such that they do not contact one another.

According to another aspect of the bicycle assembly, the upper and lower shock couplers are identical.

According to another aspect of the bicycle assembly, the base of the eccentric insert includes a first mating surface, and the channel comprises a second mating surface. The first and second mating surfaces are shaped to cooperate to prevent rotation of the base about the axis of said pin aperture when the suspension assembly is in the first assembled configuration.

According to another aspect of the bicycle assembly, the base of the eccentric insert includes a third mating surface. The third and second mating surfaces are shaped to cooperate to prevent rotation of the base about the axis of said pin aperture when the suspension assembly is in the second assembled configuration.

According to another aspect of the bicycle assembly, the first and third mating surfaces are positioned at opposite sides of base of the eccentric insert.

According to another aspect of the bicycle assembly, the base of the eccentric insert includes a rectangular shape, and the first and third mating surfaces are at positioned at opposite sides of the rectangular shape.

According to another aspect of the bicycle assembly, the cylindrical body at least partially overhangs the first mating surface.

According to another aspect of the bicycle assembly, at least one lateral edge of the base engages with at least one lateral side of the channel to prevent rotation of the eccentric insert.

According to another aspect of the bicycle assembly, at least two lateral edges of the base engage with corresponds lateral sides of the channel to prevent rotation of the eccentric insert.

According to another aspect of the bicycle assembly, the pin includes a bolt.

Another bicycle assembly includes a main frame, a sub-frame, and a shock absorber assembly for controlling rotation of the sub-frame with respect to the main frame. The shock absorber assembly defines a location for mounting a rear wheel and includes a shock absorber with first and second ends. The shock absorber couples at its first end to the main frame. An extension body has first and second ends. The extension body couples at its first end to the sub-frame and at its second end to the second end of the shock absorber. The either the shock absorber of the extension body includes an eyelet and other one includes a channel. The extension body is coupled with the shock absorber by a pin extending through the eyelet. An eccentric insert has a body disposed within the eyelet. The pin extends through a pin aperture disposed through the body. An axis of the pin aperture is offset from an axis of the body and the eccentric insert includes a base. The base extends radially outward from at least a portion of the body, and the base is disposed within the channel. The base has a first edge engaged with a first side of the channel such that the eccentric insert is prevented from rotating within the channel with respect to the extension body.

According to another aspect of the bicycle assembly, the base of the eccentric insert includes a second edge opposite the first edge. The second edge engages with a second side of the channel such that the eccentric insert is prevented from rotating within the channel.

According to another aspect of the bicycle assembly, the extension body includes the channel and the shock absorber includes the eyelet.

According to another aspect of the bicycle assembly, the eccentric insert includes an upper shock coupler with the base and a lower shock coupler with a second base. The pin aperture extends through both the upper and lower shock couplers.

According to another aspect of the bicycle assembly, the extension body includes an upper deck and a lower deck, a channel disposed in the upper deck, and a second channel disposed in the lower deck. The upper and lower shock couplers are insertable between the upper and lower decks within the channels.

According to another aspect of the bicycle assembly, the upper and lower shock couplers each include an angled surface positioned such that alignment of the angled surfaces allows the eccentric insert to be assembled into the eyelet with both the base of the upper shock coupler and the second base of the lower shock coupler in contact with the eyelet.

According to another aspect of the bicycle assembly, the upper and lower shock couplers are identical.

According to another aspect of the bicycle assembly, the body of the eccentric insert at least partially overhangs the first edge of the base.

According to another aspect of the bicycle assembly, the pin includes a bolt.

In another bicycle shock absorber assembly, a shock absorber has first and second ends. The second end has an eyelet. An extension body has first and second ends. The second end of the extension body couples with the second end of the shock absorber by a pin extends through the extension body and the eyelet. An eccentric insert has a body and a flange. The body is disposed within the eyelet. The pin extends through a pin aperture within the body and the flange. The pin aperture is offset from a central axis of the body. The flange of the eccentric insert is capable of being disposed within a channel of the extension body in at least two different orientations each corresponds to a different overall length of the shock absorber assembly. The first orientation has a first edge of the flange engaged with a first side of the channel to prevent rotation of the eccentric insert with respect to the extension body. The second orientation includes a second edge of the flange engaged with the first side of the channel to prevent rotation of the eccentric insert with respect to the extension body.

According to another aspect, the pin aperture of the eccentric insert is offset towards the first edge from the central axis of the body.

According to another aspect, the eccentric insert includes an upper shock coupler has the flange and a lower shock coupler has a second flange. The pin aperture extends through the upper and lower shock couplers.

According to another aspect, the extension body includes an upper deck and a lower deck. The channel is disposed in the upper deck and a second channel is disposed in the lower deck. The upper and lower shock couplers insert between the upper and lower decks within the channels.

According to another aspect, the upper and lower shock couplers each include an angled surface positioned such that alignment of the angled surfaces allows the eccentric insert to be assembled into the eyelet with both the flange of the upper shock coupler and the second flange of the lower shock coupler in contact with the eyelet.

According to another aspect, the pin includes a bolt.

BRIEF DESCRIPTION

These and other features, aspects and advantages are described below with reference to drawings of specific embodiments, which are intended to illustrate but not to limit the present invention.

DETAILED DESCRIPTION

Figure 1:
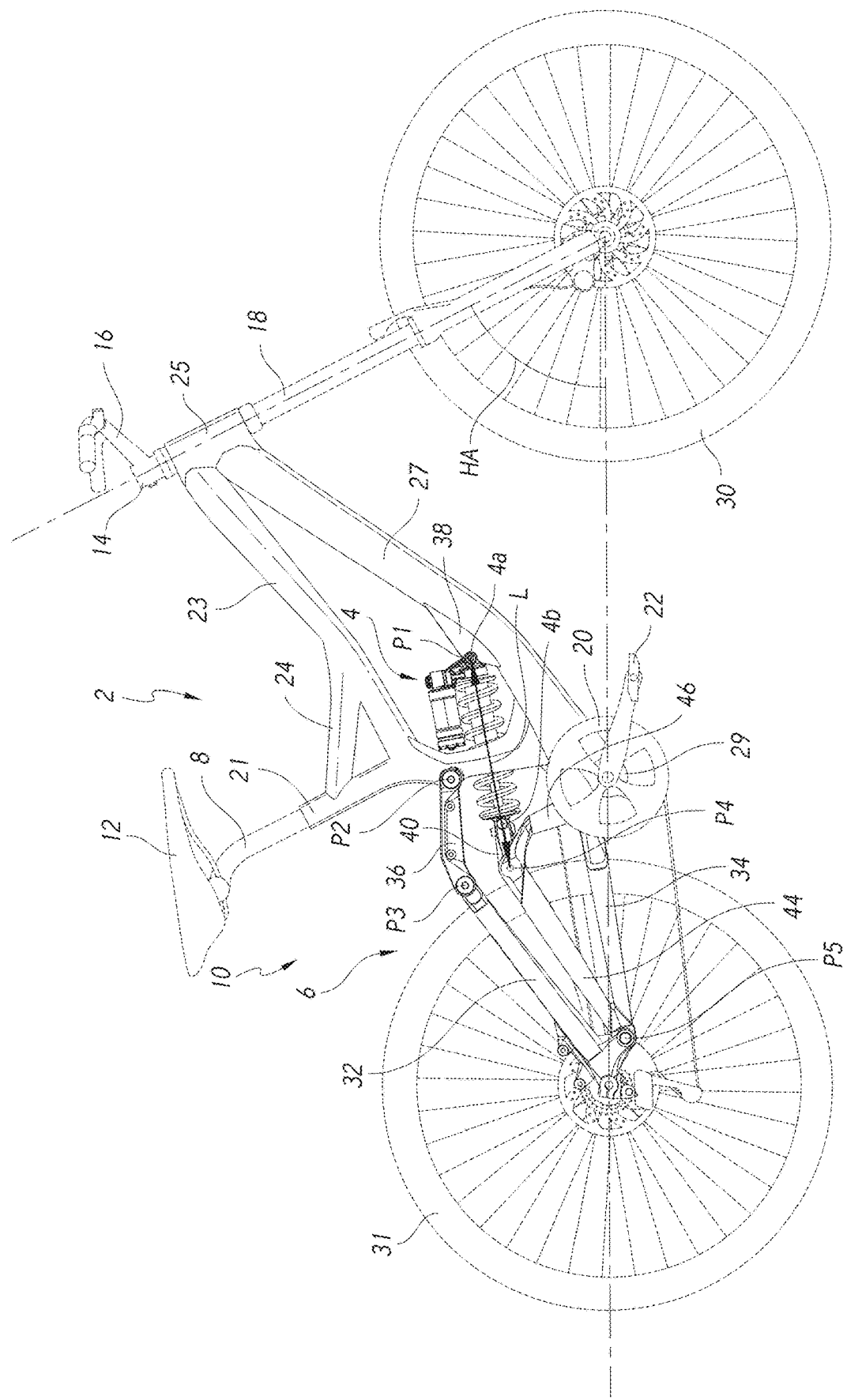
FIG. 1 illustrates a bicycle assembly.
Figure 2:
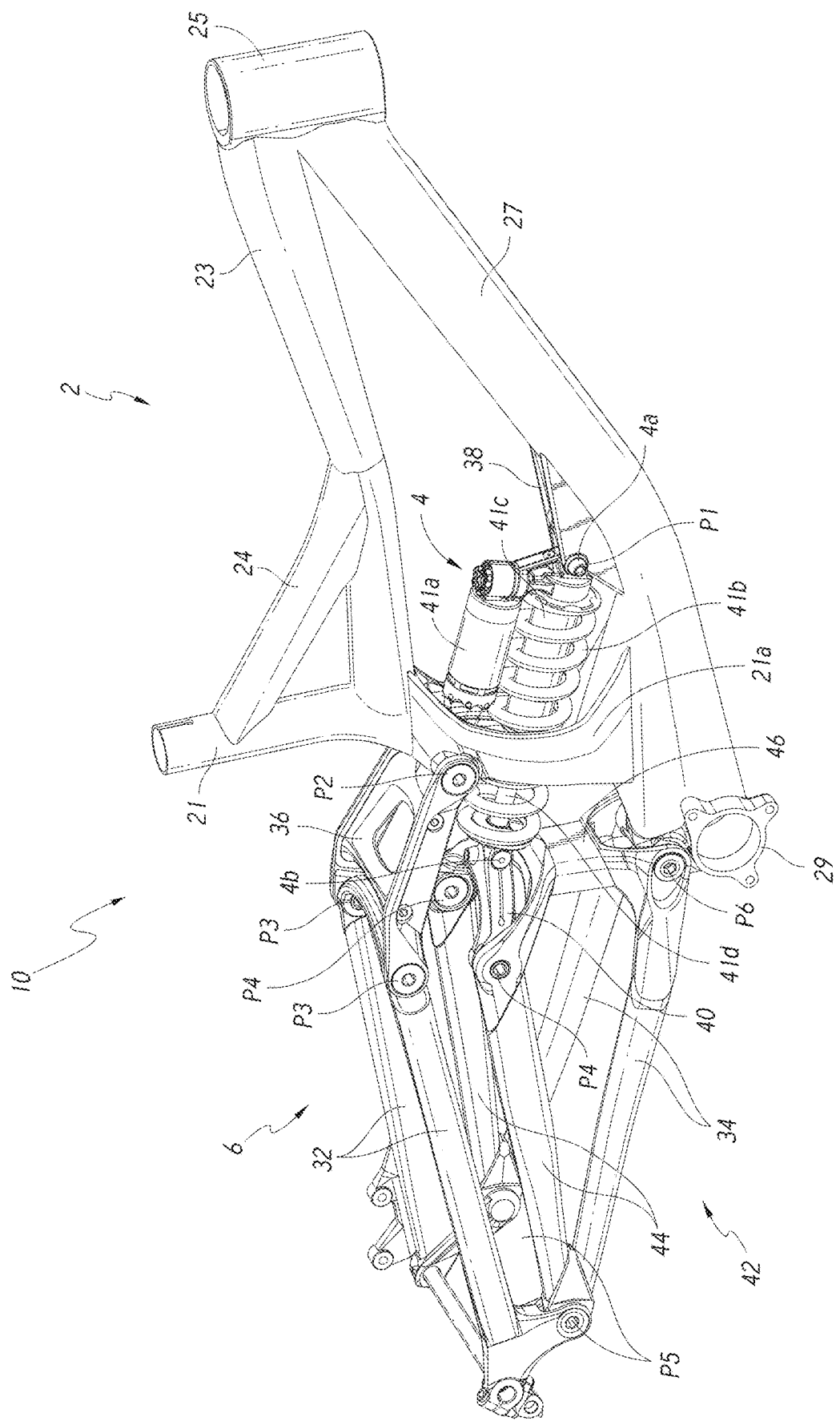
FIG. 2 is a perspective view of a subassembly of the bicycle assembly of FIG. 1.

With reference to FIGS. 1-2, a bicycle has a bicycle frame 10 with a rear suspension system. The bicycle frame 10 is made-up of a main frame 2, a shock absorber 4 and a sub-frame 6. A main frame 2, according to some embodiments, has a seat tube 21, top tube 23 and a head tube 25. The top tube 23, or any other intermediate tube, can connect the seat tube 21 and the head tube 25. A seat post 8 with an attached saddle 12 can be installed in the seat tube 21. A steering post or column 14 connecting the handle bars 16 and the fork 18 can be installed in the head tube 25 for controlling a front wheel 30. The fork 18 can support the front wheel 30. Some embodiments may further include a down tube 27 and a bottom bracket 29. The down tube 27 can connect the bottom bracket 29 and the head tube 25. A pedal assembly 20 and can be installed on the bottom bracket 29 to which pedals 22 can be attached.

According to some embodiments, the main frame 2 can further include one or more gussets or cross tubes 24. The cross tubes 24 can connect various parts of the main frame 2. For example, in FIGS. 1-2, the cross tube 24 connects the seat tube 21 and the top tube 23. Cross tubes 24 can increase the frame's stability and allow for additional design features, such as a downward sloping top tube 23.

The bicycle frame 10 can also include the sub-frame 6 that is controlled by a shock absorber 4. The sub-frame 6 is movable relative to the main frame 2. The shock absorber 4 regulates movement (e.g., absorbs impacts, dampens vibrations, etc.) between the sub-frame 6 and the main frame 2 to form the suspension assembly. Several pivot axis locations (e.g., P1-P6) for the suspension system are shown in FIGS. 1-2 to illustrate the various points of rotation on the bicycle frame 10 (e.g., between the sub-frame 6 and the main frame 2). The pivot axis locations P1-P6 can define connection points, which in some embodiments and in some locations can include bushings, or bearings, though this is not required. For example, in some embodiments there are cartridge ball bearings at any subset of the pivot axis locations P1-P6.

The sub-frame 6 can include a pair of seat stays 32 and a pair of chain stays 34. Each seat stay 32 can connect with a corresponding chain stay 34 and can support a rear wheel 31. This connection can be fixed or pinned to allow for rotation of the rear wheel 31. In some embodiments, the chain stays 34 are hingedly connected to the main frame 2 at or near the bottom bracket 29 at the pivot axis point P6.

A link 36 can also be used to connect the main frame 2 and sub-frame 6. In some embodiments, the link 36 is pivotally connected at opposite ends between the main frame 2 and sub-frame 6. In some embodiments, the link 36 can be attached to the shock absorber 4, instead of, or in addition to, either the main frame 2 or the sub-frame 6.

A forward end of the shock absorber 4 is shown rotatably coupled to the main frame 2 for a rotation about the pivot axis P1. The shock absorber 4 can be coupled with the main frame 2 at a shock mount 38 (e.g., coupled with the top or down tubes 23, 27, and/or the like). A rearward end of the shock absorber 4 is coupled to an extension body 40 which is coupled to the sub-frame 6. The forward and rearward ends 4a, 4b can each include an eyelet for receiving a pin connector (which may comprise, for example, a bolt, a shoulder bolt, a bolt and bushing combination, and/or any other suitable type of connector).

The extension body 40 can be rotatably coupled with a shock mount assembly 42 of the sub-frame 6. The shock mount assembly 42 can include connection arms 44. The extension body 40 can be generally U-shaped to couple with the connection arms 44. The connection arms 44 can extend substantially parallel with the seat stays 32 and a first end of the connection arms 44 can couple with the seat stays 32 or chain stays 34. A second end of the arms 44 can couple with the extension body 40. Optionally, a connection arm 46 can pivotably connect the extension body 40 with the bottom bracket 29.

Though one configuration of a suspension assembly of bicycle frame 10 is shown, those skilled in the art would understand that various frame and suspension assembly configurations are possible. For example, in some implementations of suspension assemblies, the extension body 40 straddles one or more tubes of the main frame 2 or sub-frame 6. For example, the extension body 40 can straddle the seat tube 21 instead of the shock absorber 4 passing through a hollow portion 21a of the seat tube 21. In another example, the extension body 40 is used in one of Specialized Bicycle Components, Inc.'s FSR® suspension designs.

The shock absorber 4 can be configured in any conventional manner, as is known in the art. For example, shock absorber 4 can be air-sprung, coil-sprung, or other. The shock absorber 4 can include a reservoir and adjustment mechanism 41a, a coil 41b, a housing 41c, a shaft 41d, and the forward and rearward eyelets.

The shock absorber 4 can be used to control the amount of movement between the main frame 2 and the sub-frame 6 and the rate of change in their relative positions. The shock absorber can absorb impacts and dampen vibrations of the suspension assembly due to road or trail conditions. The shock absorber 4 can also control one or more parameters of the geometry of the suspension system, based on an adjustable overall length of the shock absorber 4 combined with the extension body 40, as described below. For example, the shock absorber assembly can be adjusted to soften (decrease) or steepen (increase) the head angle HA formed between a centerline of the front and rear wheels 30, 31 and an axis of the head tube 25. The head angle HA corresponds to the angle the head tube forms with a ground surface. The higher (steeper) the head angle HA, the easier or faster steering for the front wheel 30 and the easier a rider will be able to climb. A lower (slacker) head angle HA provides for harder or slower steering and provides additionally stability at high speeds. Thus, adjustment of the head angle HA can have significant impact on the performance characteristics of any bicycle.

In some implementations, the head angle HA can be largely controlled by adjustment of an overall length L of a shock absorber assembly (e.g., an assembly comprising shock absorber 4 and extension body 40), as illustrated in FIG. 1. The overall length L can be the linear distance between the forward end 4a of the shock absorber 4 (e.g., at pivot point P1) and the rearward end 4b or connection point of the extension body 40 with the sub-frame 6 (e.g., at pivot point P4). Adjustment of the overall length L can control the head angle HA and/or other suspension geometry parameters, such as bottom bracket height and/or the like. A simple and reliable mechanism for the adjusting (e.g., lengthening or shortening) the overall length L can thus be desirably included in the shock absorber assembly, as described below.

Figure 3A:
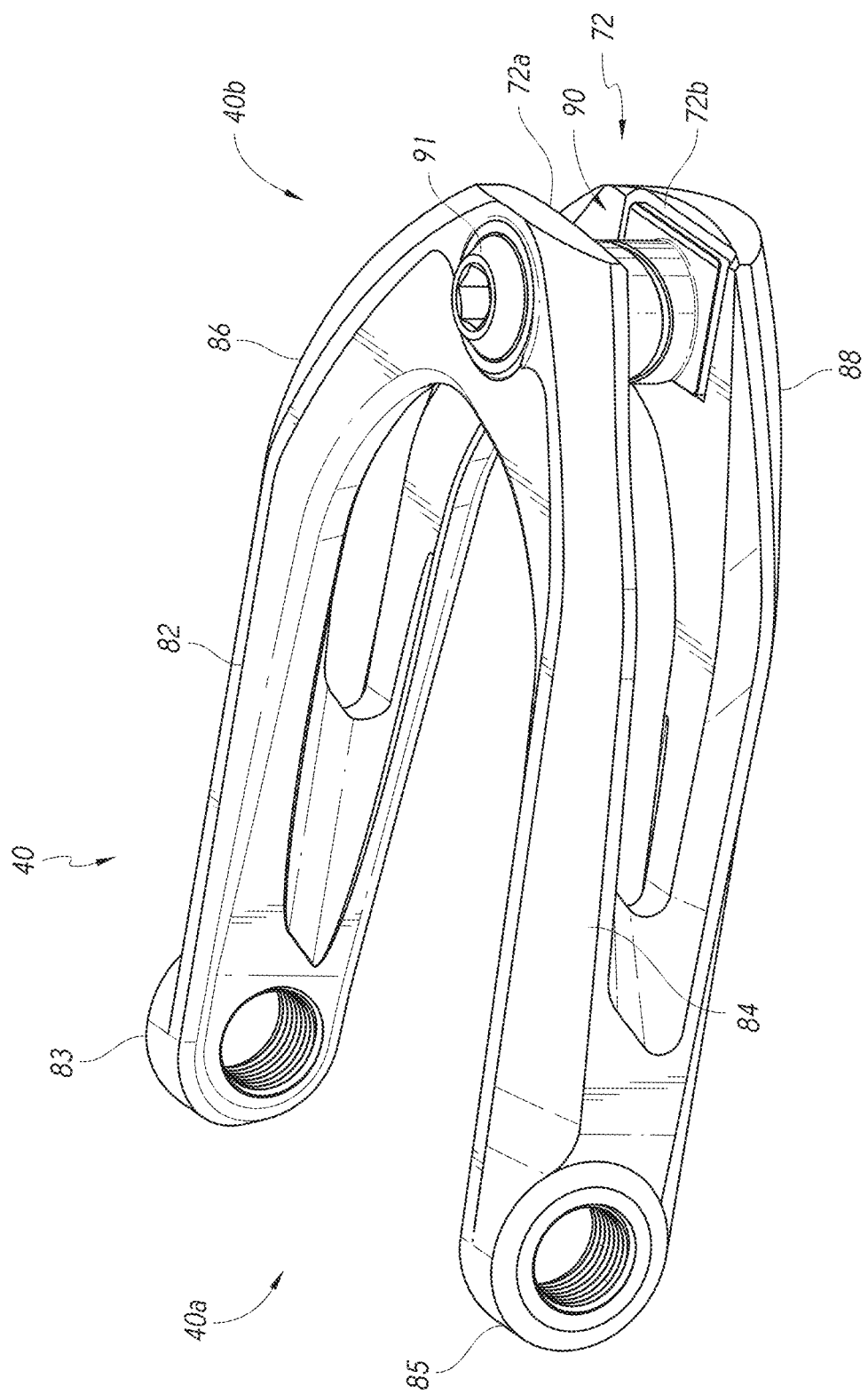
FIG. 3A illustrates an extension body assembly.
Figure 3B:
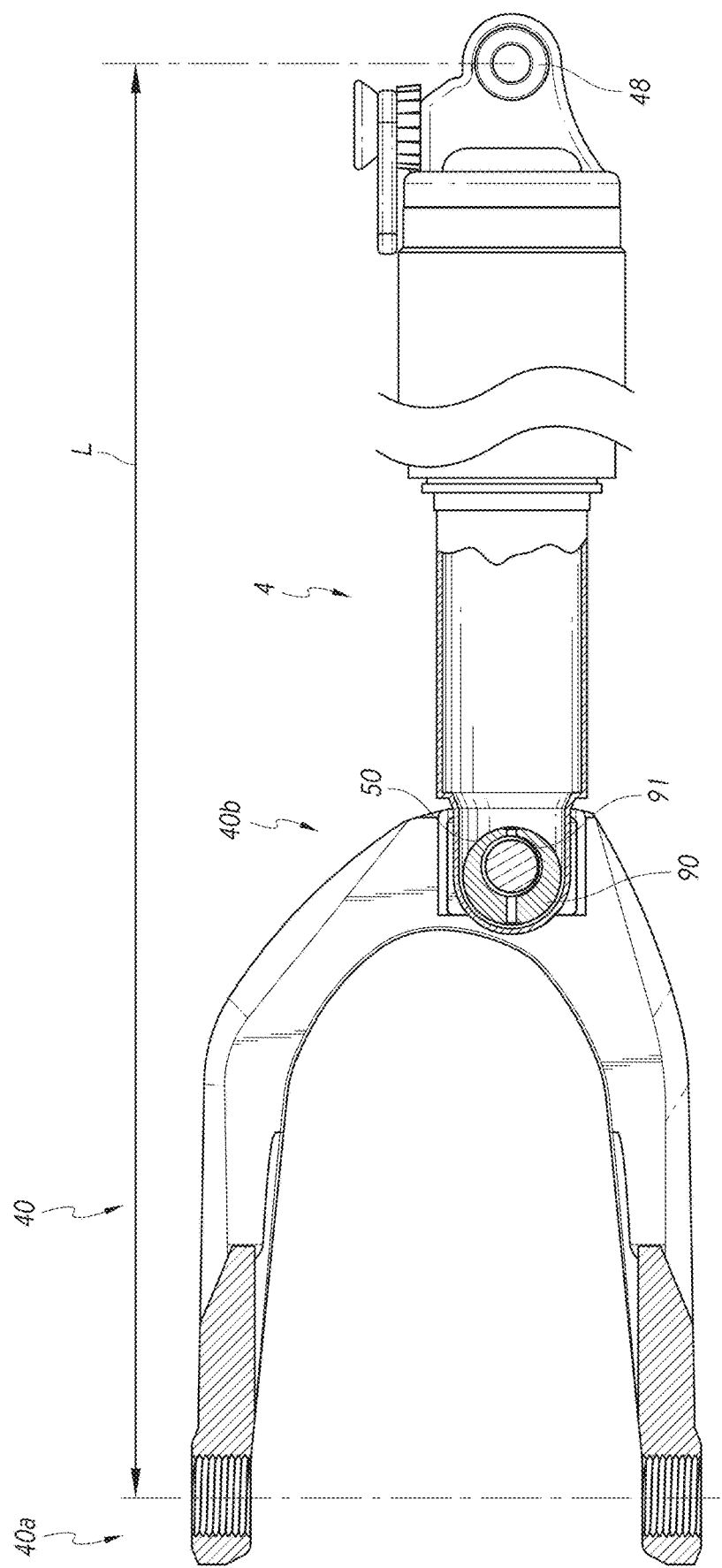
FIG. 3B is a section view of the extension body assembly of FIG. 3A, further including a shock absorber.

FIG. 3A illustrates an extension body 40 and an eccentric insert 90 (which may also be referred to as a spacer, bushing, collar, and/or the like) used to adjust the configuration of a shock absorber assembly (e.g., to adjust the length L shown in FIG. 3B). FIG. 3B illustrates the extension body 40 and eccentric insert 90 assembled with a shock absorber 4. The extension body 40 and shock absorber 4 in FIGS. 3A-3B can be used to perform a similar function as the extension body 40 and shock absorber 4 as shown in FIGS. 1 and 2. The extension body 40 can include a first end 40*a* and a second end 40*b*. The first end 40*a* can include first and second extension arms 82, 84 that generally form a U-shape. The rearward ends 83, 85 of the extension arms 82, 84 can couple (e.g., pivotally at P4) with the sub-frame 6. The rearward ends 83, 85 can include apertures for receiving pins and/or the like to form the pivotal coupling. In this embodiment, the apertures at rearward ends 83, 85 are threaded to accept a bolt that couples to a bearing or the like. In other embodiments, other pivotal coupling configurations may be used.

Figure 4:
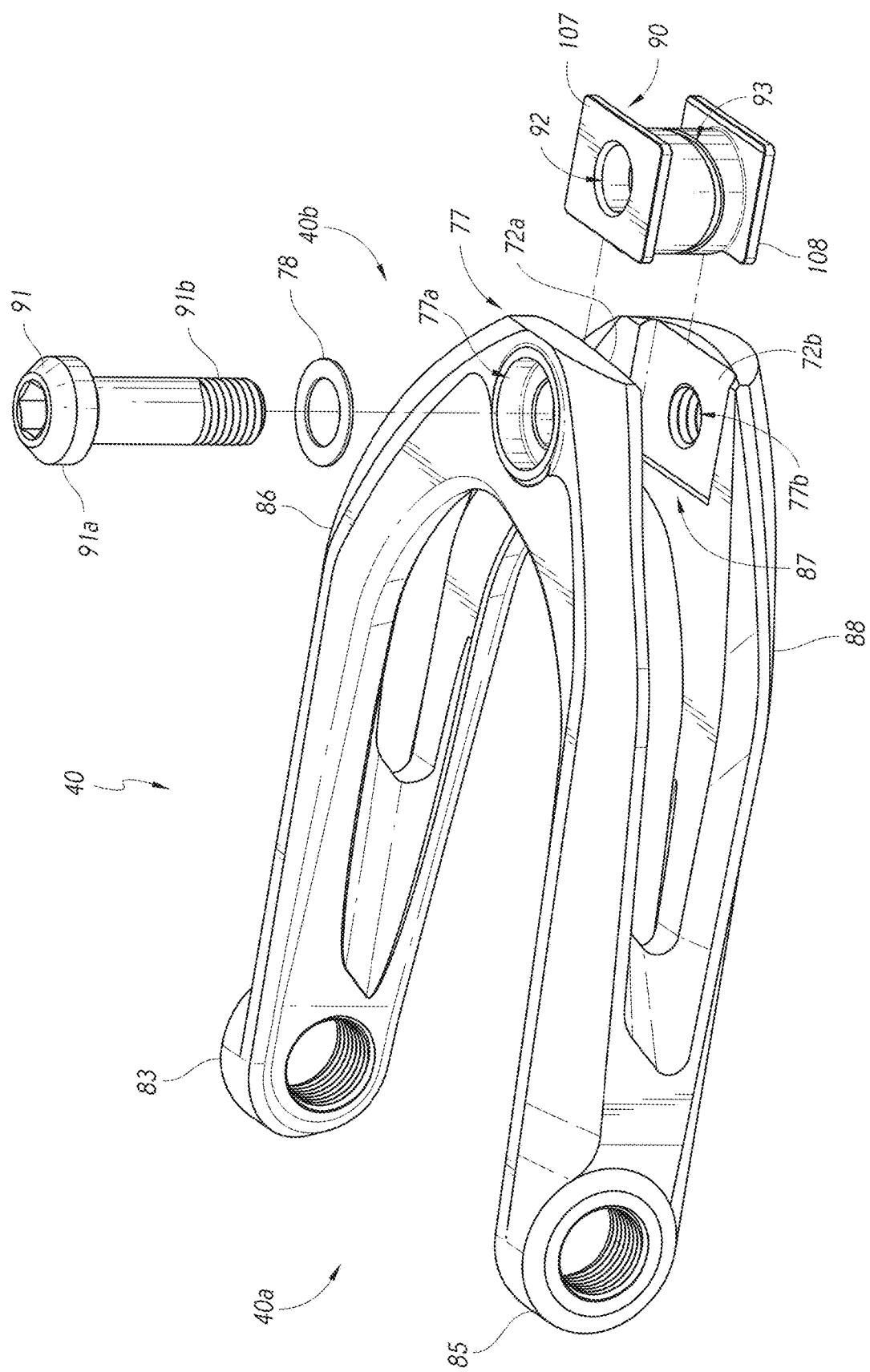
FIG. 4 illustrates an exploded view of the extension body assembly of FIG. 3A.

FIGS. 4-12 illustrate additional views and details of the extension body 40 and eccentric insert 90. Referring to FIGS. 3A-4, a rearward eyelet 50 of the shock absorber 4 can attach with the second end 40*b* of the extension body 40 via the eccentric insert 90. A forward eyelet 48 can couple the shock absorber 4 with the main frame of the bicycle. A pin 91 (in this embodiment, a bolt, but in other embodiments may not be a bolt) can be inserted through an opening 77 of the second end 40*b* and through the rearward eyelet 50 to couple the shock absorber 4 with the extension body 40. The eccentric insert 90 can include a pin aperture or hole 92 extending through a body 93. The body 93 can be at least partially disposed within the rearward eyelet 50. In this manner, the pin 91 can extend through the opening 77, the eccentric insert 90 (through the pin aperture 92) and through the rearward eyelet 50, thereby coupling together the extension body 40 and the shock absorber 4. As further described below, the eccentric insert 90 can be installed in different configurations, to adjust the overall length L (shown in FIG. 3B) of the shock absorber assembly. The overall length L can be defined as a distance between the forward and rearward pivot axes (e.g., between an axis defined by forward eyelet 48 and an axis defined by apertures 83, 85 or a pin positioned within the aperture(s)).

The eccentric insert 90 can be received within a channel 72 of the extension body 40. The channel 72 can desirably maintain the alignment/orientation of the eccentric insert 90 with respect to the extension body 40 by engaging one or more sides of the eccentric insert 90 with one or more sides of the channel 72, as described further below. As explained in further detail below, the eccentric insert 90 can have at least two assembled positions or orientations within the channel 72 that modify the overall length L.

The extension body 40, in some implementations, can be divided into an upper deck 86 and a lower deck 88. While the terms 'upper' and 'lower' are used, these terms are not to be understood as absolute or relative positions in a fully assembly bicycle frame. The upper and the lower decks 86, 88 can be spaced apart at the second end 40*b* of the extension body 40, to form a void or open space 87 therebetween. In other implementations, the extension arms 82, 84 can extend around the second end 40*b* of the extension body 40 without separation into upper and lower decks 86, 88 (e.g., the extension arms 82, 84 can be generally solid, include lightening holes, or be any other shape). The rearward eyelet 50 and eccentric insert 90 can be at least partially received between the upper and lower decks 86, 88 when assembled with the extension body 40. One advantage of separating the extension body 40 into upper and lower decks 86, 88 is that the upper and lower decks 86, 88 can desirably flex or bend toward one another when pin 91 is tightened, thus clamping against the rearward eyelet 50 of the shock absorber to form a relatively rigid connection between the extension body and shock absorber. In some embodiments a portion of the upper and/or lower decks 86, 88 may clamp directly against the rearward eyelet 50 of the shock absorber. In other embodiments, such as the embodiment shown in FIGS. 3A-12, the upper and/or lower decks 86, 88 may clamp against flanges 107, 108 of the two-piece eccentric insert 90, causing the flanges 107, 108 to clamp against the rearward eyelet 50 of the shock absorber.

The opening 77 includes an upper opening 77*a* in the upper deck 86 and a lower opening 77*b* in the lower deck 88. The upper opening 77*a* can include a recess within an outer surface of the upper deck 88 for receiving a flanged head 91*a* of the pin 91 in an inset manner. In some implementations, a washer 78 can be included with the pin 91 that can optionally be received within the recess of the upper opening 77*a*. A threaded end 91*b* of the pin 91 can extend into the lower opening 77*b*. The end 91*b* can be threaded and engage with threads disposed within the lower opening 77*b*. In other implementations, the end 91*b* can extend through the lower opening 77*b* (the lower opening optionally extending all the way through the lower deck 88) and be coupled with a nut, cotter pin, or other mechanical coupler mechanism. By including a head 91*a* and an end 91*b*, the pin or bolt 91 can cause the upper and lower decks 86, 88 to clamp together, as described above, as the bolt is tightened.

The channel 72 can include an upper channel or recessed portion 72*a* in the upper deck 86 and a lower channel or recessed portion 72*b* in the lower deck 88. An upper base or flange 107 of the eccentric insert 90 can be received within the upper channel 72*a*. A lower base or flange 108 of the eccentric insert 90 can be received within the lower channel 72*b*. The upper and lower openings 77*a*, 77*b* can be aligned with the upper and lower channels 72*a*, 72*b*.

Figure 11:
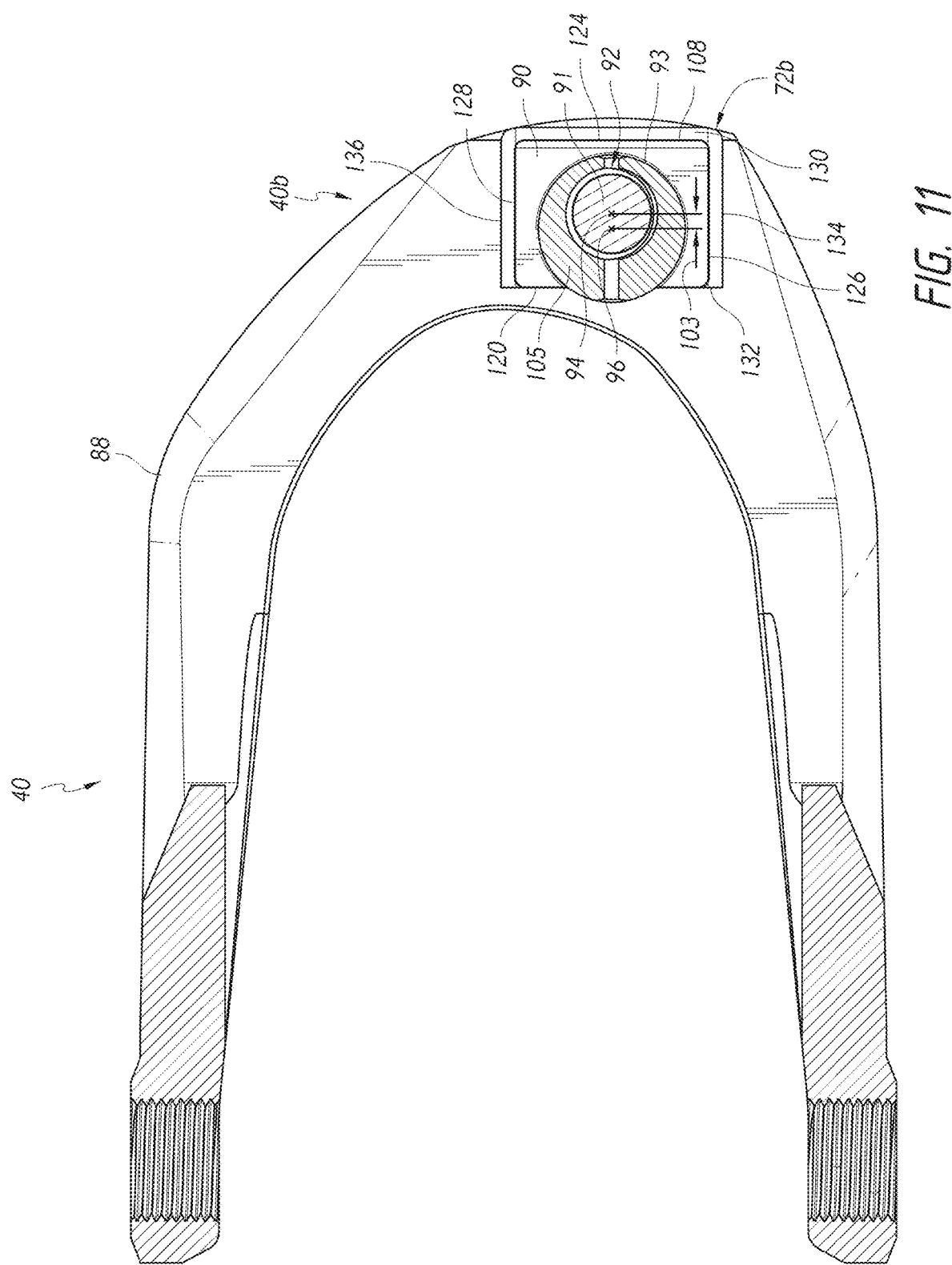
FIG. 11 is a section view of the extension body assembly of FIG. 3A in a first configuration.

The upper and lower bases or flanges 107, 108 of the eccentric insert 90 can be inserted between the upper and lower decks 86, 88 within the upper and lower channels 72*a*, 72*b* in a first assembled position, as shown in FIGS. 3A and 11. The pin aperture 92 can be aligned with the upper and lower openings 77*a*, 77*b*. The pin 91 can be inserted into the pin aperture 92 of the eccentric insert 90 and the upper and lower openings 77*a*, 77*b*, thereby holding the eccentric insert 90 in place. In a second assembled position of the eccentric insert 90 (shown in FIG. 12), the upper and lower flanges 107, 108 of the eccentric insert 90 can be reversed (e.g., rotated 180 degrees about an axis extending through the pin aperture 92) and inserted within the upper and lower channels 72*a*, 72*b*. The pin 91 can then be inserted into the pin aperture 92 of the eccentric insert 90 and the upper and lower openings 77*a*, 77*b*, thereby holding the eccentric insert 90 in place in the second assembled position.

Figure 6:
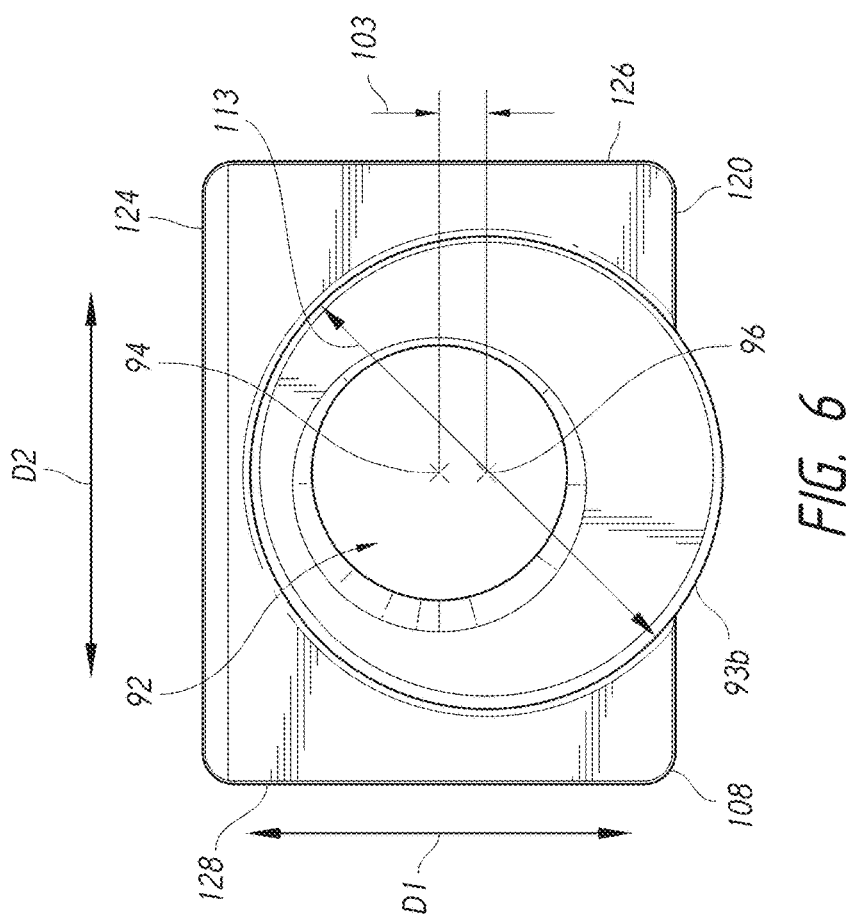
FIG. 6 is a top view of the bottom shock coupler of the eccentric insert of FIG. 5.
Figure 5:
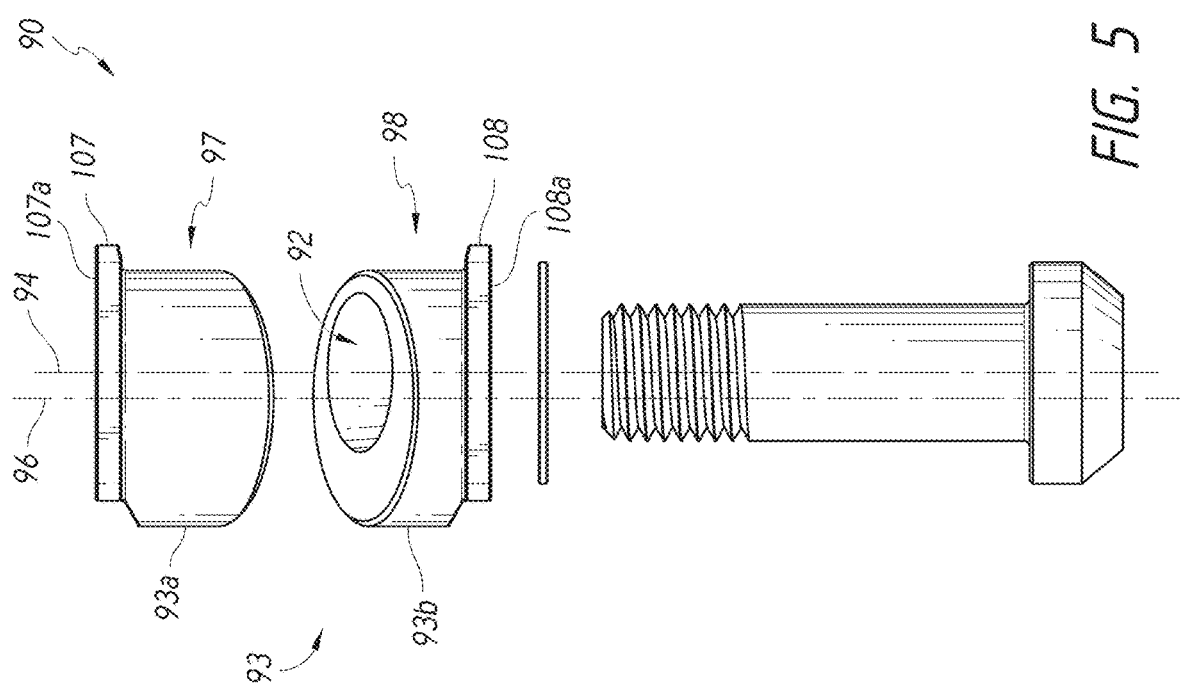
FIG. 5 illustrates an exploded view of an eccentric insert.

Referring to FIGS. 5-6, the eccentric insert 90 can include one or more components such as upper and lower shock couplers 97, 98. The upper shock coupler 97 can include the upper flange 107 and an upper portion 93*a* of the body 93. The lower shock coupler 98 can include the lower flange 108 and a lower portion 93*b* of the body 93. The upper and lower shock couplers 97, 98 can be assembled together within the rearward eyelet 50 (as shown in FIG. 3B. The upper shock coupler 97 can be assembled with the rearward eyelet 50 on one side and the lower shock coupler 98 can be assembled on an opposite side (e.g., the upper and lower portions 93*a*, 93*b* inserted into the rearward eyelet 50). In some implementations, the upper and lower shock couplers 97, 98 are identical in structure. In other embodiments, different structures may be used for the upper and lower shock couplers 97, 98. Using identical structures may be desirable, however, for example, to reduce manufacturing costs. In another implementation, the eccentric insert 90 includes only one base and the body 93 is not split into the upper and lower portions 93a, 93b. The one base can maintain alignment of the eccentric insert within the channel 72.

As the upper and lower shock coupler 97, 98 are identical in the illustrated embodiment, only the lower shock coupler 98 need be described. The lower flange 108 of the lower shock coupler 98 can be generally rectangular (e.g., square) and include a bottom 108a and a plurality of edges (e.g., a front edge 120, back edge 124, a right-side edge 126, and a left-side edge 128). The edges 120-128 can be generally straight and at right angles. In other implementations of the flange 108, the edges 120-128 can be angled to create another polygonal shape (e.g., parallelogram, square, triangular, hexagonal or any other suitable shape). In still other implementations, any of the edges 120-128 of the flange 108 can be curved or include other non-linear patterns. For example, the front edge 120 and the back edge 124 can be generally S-shaped or include a plurality of V-shaped cutout portions. The flange 107 of the upper shock coupler 97 can similarly include a bottom 107a and a plurality of edges as described with respect to lower flange 108.

Figure 8:
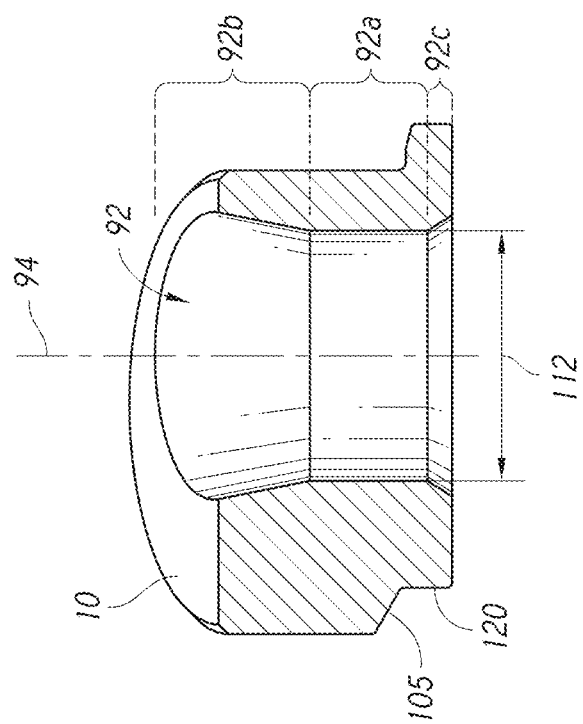
FIG. 8 is a section view taken along the line 8-8 in FIG. 7.
Figure 7:
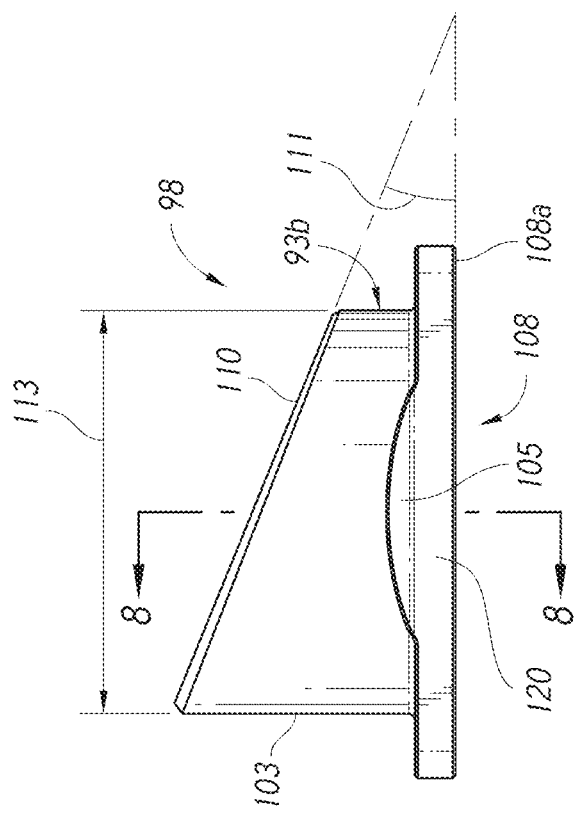
FIG. 7 is a front view of the shock coupler of FIG. 6.
Figure 10:
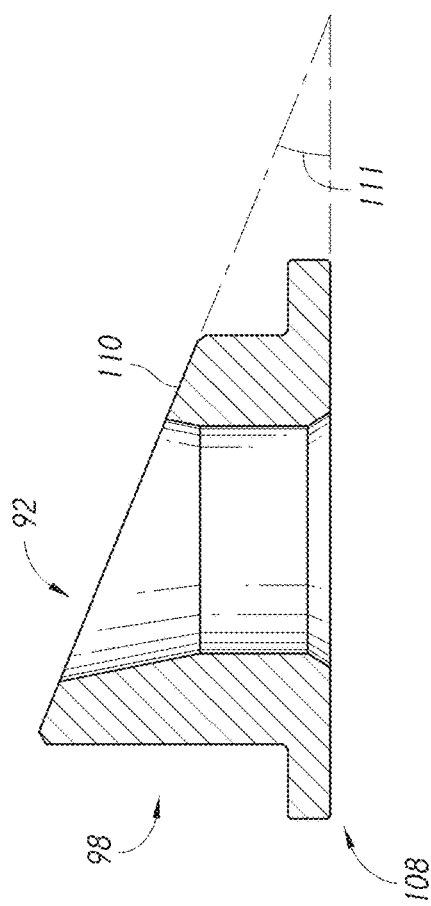
FIG. 10 is a section view taken along the line 10-10 in FIG. 9.
Figure 9:
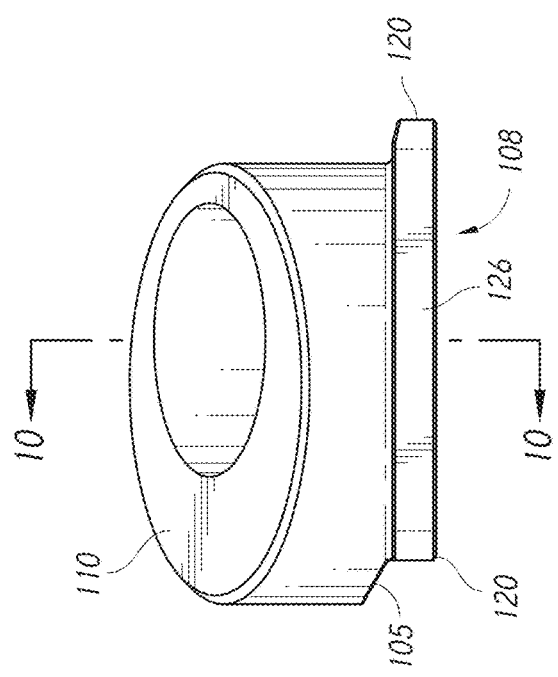
FIG. 9 is a right side view of the shock coupler of FIG. 6.

The body 93 can comprise a cylindrical outer surface with a longitudinal axis 96. The body 93 (e.g., at least a portion that is disposable within the rearward eyelet 50) can have a diameter 113. The diameter 113 can be configured to mate with an inner diameter of the rearward eyelet 50, such as using a slip fit. For example, the diameter 113 can be approximately 19.0 mm. In other implementations, the diameter 113 can range between 6.0 mm to 25.0 mm, or otherwise correspond to the inner diameter of the rearward eyelet 50 (or a bushing disposed therein). As shown in FIGS. 7 and 8, an overhang portion 105 of the body 93 can extend over the front edge 120 of the flange 108. In other embodiments, the body 93 may not overhang a portion of the base.

The pin aperture 92 can generally extend along a longitudinal axis 94 through the body 93 of the eccentric insert 90. The longitudinal axes 96 and 94 can be offset from each other an offset distance 103. In some implementations, the offset distance 103 can be in either or both of first and second coordinate directions D1 or D2. This offset distance 103 can allow for the different assembled positions of the eccentric insert 90 to correspond to different overall lengths L.

Figure 12:
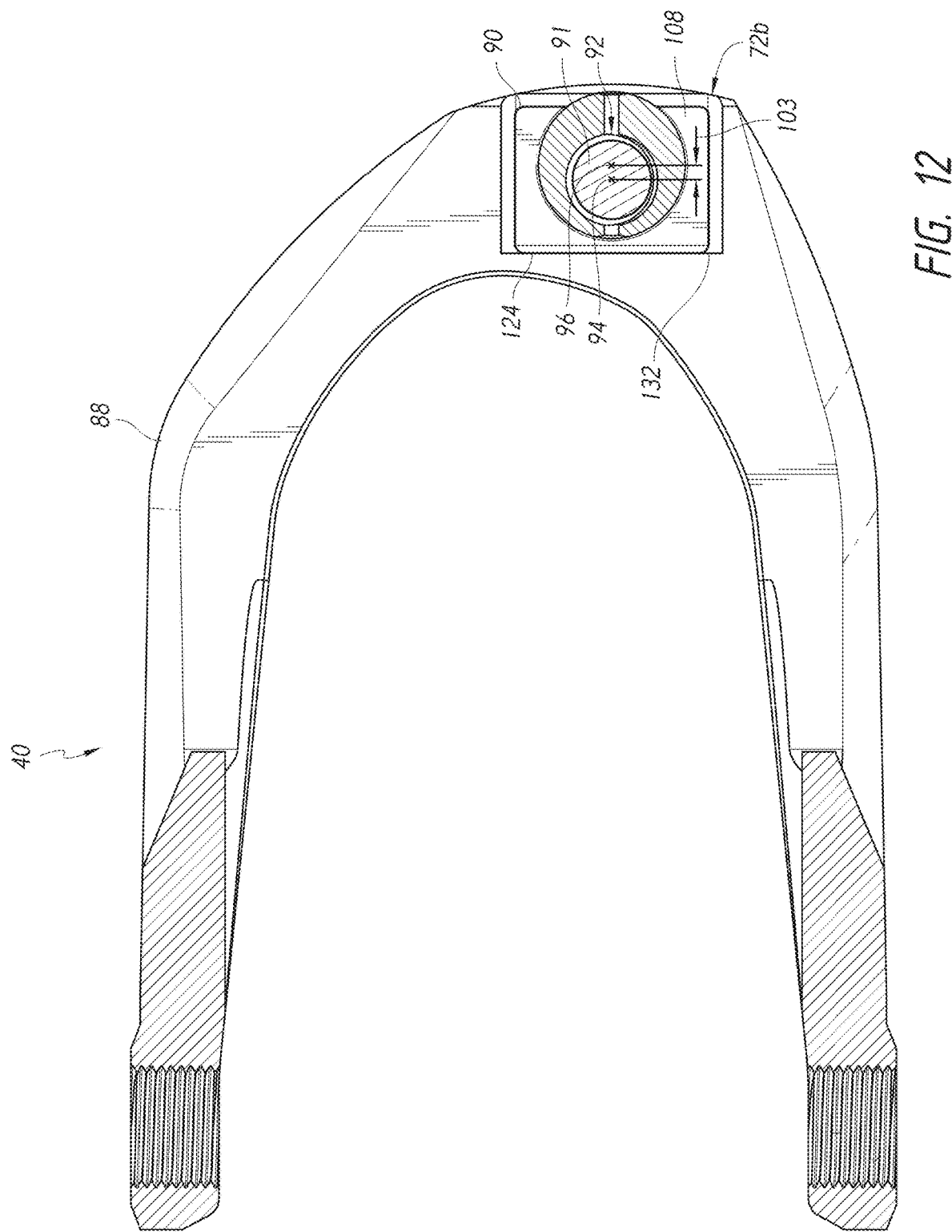
FIG. 12 is a section view of the extension body assembly of FIG. 3A in a second configuration.

In one implementation, the lower shock coupler 98 has an offset solely in the D1 direction (as illustrated in FIG. 6). The lower shock coupler 98 can be assembled with the extension body 40 in the first assembled position with the front edge 120 inserted first into the lower channel 72b (as illustrated in FIG. 11). Because of the offset distance 103, the body 93 will be positioned deeper within the extension body 40, causing the rearward eyelet 50 to also be positioned deeper within the extension body 40 relative to pin 91 (through pin aperture 92). This configuration will shorten the overall length L (as compared to the offset distance being zero). The lower shock coupler 98 can alternatively be assembled with the extension body 40 in the second assembled position with the back edge 124 inserted first into the lower channel 72b (as illustrated in FIG. 12). Because of the offset distance 103, this second configuration will cause the body 93 and rearward eyelet 50 to be positioned shallower within the extension body, thus lengthening the overall length L (as compared to the offset distance being zero). Other offset distances and locations (e.g., in directions D1 or D2) are contemplated herein. The offset distance in either the D1 or D2 directions can, in some implementations be approximately 10.0 mm. In some embodiments, the offset distance 103 can be within a range of 2.0 mm to 35.0 mm. In some embodiments, the offset distance 103 can be within a range of 5.0 mm to 20.0 mm. In some embodiments, the offset distance 103 can be within a range of 2.0 mm to 5.0 mm.

The upper and lower shock couplers 97, 98 can be assembled together within (on opposite sides of) the rearward eyelet 50. Stated another way, the upper portion 93a of the upper shock coupler 97 can be inserted into one side of the rearward eyelet 50, and the lower portion 93b of the lower shock coupler 98 can be inserted into an opposite side of the rearward eyelet 50. Desirably, the upper and lower shock couplers 97, 98 are designed such that the flanges 107, 108 can contact an outer surface of the rearward eyelet 50 without the upper and lower shock couplers 97, 98 contacting each other, enabling the flanges 107, 108 to clamp against opposite sides of the rearward eyelet 50. The pin aperture 92 can be aligned as it extends through both the upper and lower portions 93a, 93b. With reference to FIG. 7, to facilitate proper assembly of the two shock couplers, the lower shock coupler 98 can include an angled face 110. The angled face 110 can be defined by an angle 111 between the lower flange 108 (e.g., the bottom 108a) and the angled face 110. In this embodiment, the angle 111 is desirably approximately 22 degrees. In some embodiments, the angle 111 can desirably be within a range of 5-45, 10-40, or 15-30 degrees. In this embodiment, the upper coupler 97 is identical in design to the lower coupler 98, and thus the upper coupler 97 can similarly have an angled face that corresponds to the angled face 110 (e.g., the angled face is at an angle that is substantially equivalent to the angle 111). In other embodiments, the designs of the upper and lower couplers may not be the same.

The angled faces of the upper and lower shock couplers 97, 98 can be aligned together in a manner that also aligns the pin aperture 92 through the eccentric insert 90 (see FIGS. 4 and 5). The angled faces can make it impossible, or at least more difficult, for the upper and lower shock couplers 97, 98 to be assembled incorrectly within the extension body 40 (e.g., an incorrect alignment would result in interference between the angled faces and prevent proper assembly of both the upper and lower shock couplers 97, 98 into the channel 72). In other implementations, other corresponding surface features of the upper and lower portions 93a, 93b can be used to align and/or prevent mis-assembly of the shock couplers 97, 98 (e.g., corresponding curved surfaces, pin and recess structures, and/or the like). In some implementations, the angled faces are in contact with one another when assembled within the channels and the rearward eyelet 50 of the shock absorber. In other implementations, the angled faces are spaced apart from each other. As discussed above, it can be desirable to have the angled faces not be in contact with one another, which can enable the flanges 107, 108 to clamp against the rearward eyelet 50 of the shock absorber. Although it is possible to have a design in which the angled faces are in contact with one another while the flanges 107, 108 are also clamped against the rearward eyelet 50 of the shock absorber, such a design may result in increased manufacturing costs due to tighter manufacturing tolerances for such a design.

As illustrated in cross-section in FIG. 8, the pin aperture 92, as it extends through the lower shock coupler 98, can include a straight section 92a, an upper tapered section 92b, and/or a lower tapered section 92c. A diameter 112 of the pin aperture 92 at the central section 92a can correspond closely to the diameter of the pin 91 (e.g., to create a slip fit that reduces excess movement). The upper tapered section 92b can be generally expanded outwards from a straight bore of the straight section 92a. The upper and lower tapered sections 92b, 92c can facilitate alignment of the pin 91 into the pin aperture 92. The longitudinal axis 94 can be aligned with a center of the straight section 92a.

Figure 13:
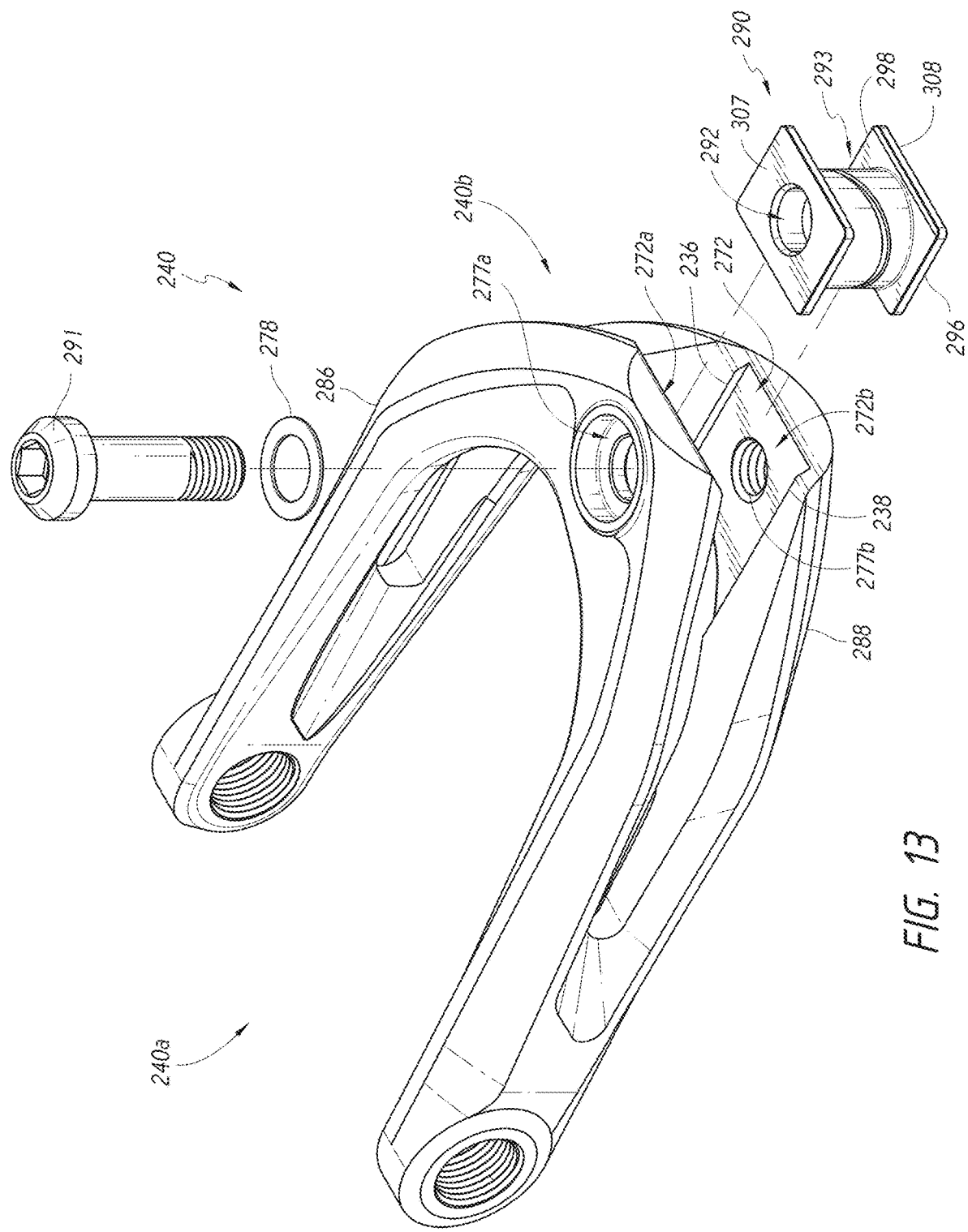
FIG. 13 is an exploded view of another embodiment of an extension body assembly in a first configuration.
Figure 14:
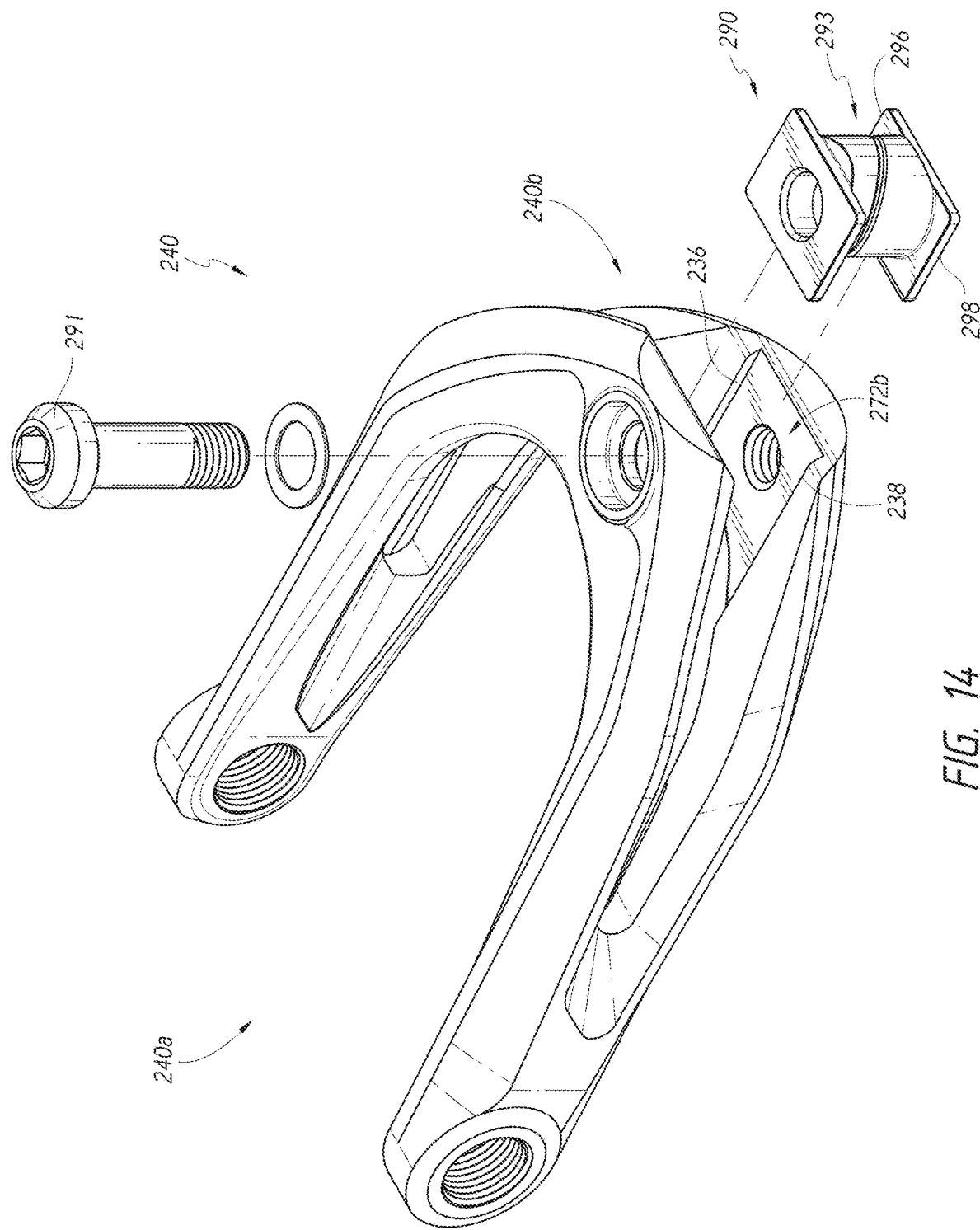
FIG. 14 is an exploded view of FIG. 13 in a second configuration.

FIGS. 11-12 illustrate the first and second assembled positions of the eccentric insert 90 in the second end 40b, respectively. In FIG. 11 the eccentric insert 90 is in the first assembled position (within the channel 72) that shortens the overall length L. In FIG. 12, the eccentric insert 90 is in the second assembled position (within the channel 72) that lengthens the overall length L, with the eccentric insert 90 rotated 180 degrees relative the first assembled position. The 180 degree rotation changes the orientation of the offset distance 103. One problem with having an eccentric insert with the longitudinal axis 96 of the outer cylindrical surface 93 being offset from the longitudinal axis 94 of the pin aperture 92 is that, when the shock absorber assembly experiences tension and/or compression loads, the eccentric insert 90 may tend to want to rotate about the longitudinal axis 94 of the pin aperture 92. The embodiments disclosed herein include features that address this problem and inhibit rotation of the eccentric insert 90 about the longitudinal axis 94 when the shock absorber assembly experiences tension and/or compression loads. One such anti-rotate feature is illustrated in FIGS. 11 and 12, and an alternative anti-rotate feature is illustrated in FIGS. 13 and 14.

As illustrated in FIG. 11, the lower channel 72b can include a back side 132, a right side 134, a left side 136 and a bottom face 130. The front edge 120 of the flange 108 can be engaged with the back side 132 of the lower channel 72b in the first assembled position. This can inhibit the eccentric insert 90 from rotating about the longitudinal axis 94 with respect to the extension body 40. The bottom 108a (see FIG. 5) can be engaged (e.g., slidingly) with the bottom face 130 of the channel 72b. In some implementations, the bottom 108a and/or the bottom face 130 are planar. In other implementations, the bottom 108a and/or bottom face 130 are correspondingly contoured (e.g., with a slot and insert extension that fits within the slot). In the second assembled position (shown in FIG. 12), the back edge 124 of the flange 108 can engage with the back side 132 of the lower channel 72b. This also can inhibit the eccentric insert 90 from rotating about the longitudinal axis 94 with respect to the extension body 40. In other implementations, any of the sides (e.g., right and left sides 134, 136) can engage with any of the edges (e.g., right and left edges 126, 128) in either of the first and second assembled positions. These configurations prevent inadvertent rotation of the eccentric insert within the channel 72. FIGS. 11 and 12 only illustrate the engagement of the eccentric insert 90 with the lower channel 72b, but the eccentric insert 90 can also have a similar engagement with the upper channel 72a.

One problem with connecting a shock absorber to an extension body is that, when two relatively hard surfaces of the same metal (e.g., anodized aluminum) are in contact with one another, there is a propensity for audible creaking. Typically, the rearward eyelet 50 and the extension body 40 are made from aluminum, magnesium, or other lightweight metals (though this is not required), and thus audible creaking may be a problem. The embodiments disclosed herein address this problem, because the eccentric insert 90 can act as an insulation barrier between the shock absorber 4 (e.g., the rearward eyelet 50) and the extension body 40. For example, in some implementations, the eccentric insert 90 can be made using a dissimilar metal (e.g., steel). This effectively separates the rearward eyelet 50 and the extension body 40 and can substantially reduce the likelihood of creaking therebetween.

In another embodiment (not illustrated, but will be understood by those of skill in the art from the above discussion and the figures), the shock absorber 4 comprises the channel 72 and the pin aperture 92 (e.g., at the rearward end 4b). The extension body 40 comprises the rearward eyelet 50 (e.g., at the second end 40b) for receiving the eccentric insert 90. The pin 91 can couple through eyelet 50, the eccentric insert 90 and the pin aperture 92 to couple the shock absorber 4 with the extension body 40. The channel 72 can have the same structure as the channel 72 described above in relation to FIGS. 3A-12 with the exception of being located at the rearward end 4b of the shock absorber. For example, the rearward end 4b can include upper and lower decks with upper and lower channels that fit a base of the eccentric insert 90. The eccentric insert 90 can be coupled with the channel 72 in two assembled positions to lengthen and shorten, respectively, the overall length L of the shock absorber assembly.

FIGS. 13-14 illustrate a second embodiment of an extension body 240 and eccentric insert 290 that is similar to the extension body 40 and eccentric insert 90. One difference is that the eccentric insert 290 is inhibited from rotating with respect to the extension body 240 in a different manner, as described below. Similar components have been given similar elemental callouts with the addition of a leading numeral. The extension body 240 can include a first end 240a and a second end 240b. The extension body can include an upper deck 286 and a lower deck 288. The eccentric insert 290 can be inserted within the second end 240b in the extension body 240 at a channel 272. The channel 272 can include upper and lower channels 272a, 272b for receiving respective flanges 307, 308 of the eccentric insert 290. The upper and lower channels 272a, 272b can be of similar design or may have some differences. The eccentric insert 290 can include a pin aperture 292 through a body 293 that receives a pin 291 and/or a washer 278. The eccentric insert 290 can be at least partially received within the rearward eyelet 50, similar to as described above with reference to FIG. 3B. The pin 291 can be inserted within an upper pin aperture 277a and/or a lower pin aperture 277b of the second end 240b of the extension arm 240.

The eccentric insert 290 can be inserted within the channel 272 in a first assembled position (FIG. 13) or second assembled position (FIG. 14). The first assembled position can shorten the overall length L and the second assembled position can lengthen the overall length L. When inserted within the lower channel 272b, the flange 308 fits between opposing sides 236, 238 of the lower channel 272b. Right and left edges 296, 298 of the flange 308 can engage with the opposing sides 236, 238, respectively, in the first assembled position. The engagement of the right and left edges 296, 298 with the sides 236, 238 prevent rotation when the eccentric insert 290 is assembled with the extension body 40. The eccentric insert 290 may also engage the upper channel 272a in a similar manner. In certain implementations, the channel 272 does not include a back side (such as the back side 132 of FIG. 11), as illustrated in FIG. 13.

Similarly, in the second assembled position (FIG. 14), the eccentric insert 290 is reversed 180 degrees and inserted within the lower channel 272b. The right and left edges 296, 298 of the flange 308 can engage with the opposing sides 238, 236, respectively (i.e., in reverse to in the first assembled position). The flange 308 can similarly include edges that engage opposite sides of the lower channel 272b to prevent rotation in the first and second assembled positions of the eccentric insert. Although FIGS. 11-14 illustrate two specific examples of how an eccentric insert can be caused to not rotate with respect to an extension body, other configurations of anti-rotate features may be used. For example, the base or flange of an eccentric insert may be configured to contact only one side surface of an extension body instead of two opposite side surfaces of an eccentric body. As another example, the eccentric insert may comprise one or more protrusions configured to fit within a mating groove or recess of the extension body as the eccentric insert is inserted into the channel of the extension body. As another example, the extension body may comprise one or more protrusions configured to fit within a mating groove or recess of the eccentric insert as the eccentric insert is inserted into the channel of the extension body.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, it is contemplated that various aspects and features of the invention described can be practiced separately, combined together, or substituted for one another, and that a variety of combination and sub-combinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A bicycle assembly comprising:
   a main frame comprising a seat tube, a head tube and an intermediate tube connecting the seat tube and the head tube;
   a sub-frame configured to rotate with respect to the main frame, wherein the sub-frame defines a location for mounting a rear wheel;
   a suspension assembly for controlling rotation of the sub-frame with respect to the main frame, the suspension assembly comprising:
      a shock absorber, the shock absorber having first and second opposing ends and first and second eyelets at each end, the first eyelet at the first end connected to the main frame and defining a first suspension assembly pivot axis;
      an extension body, the extension body having a first end connected to the shock absorber at the second eyelet and a second end comprising a pair of extension arms connected to the sub-frame and defining a second suspension assembly pivot axis;
      an eccentric insert coupled between the shock absorber and the extension body, the eccentric insert having a cylindrical body at least partially disposed within the second eyelet of the shock absorber, and a pin aperture disposed through the cylindrical body, wherein an axis of the pin aperture is offset from an axis of the cylindrical body; and
      a pin coupling the extension body and the shock absorber, the pin extending through an aperture of the extension body, the pin aperture of the eccentric insert, and the second eyelet of the shock absorber;
   wherein the extension body comprises a channel shaped to receive at least a portion of the eccentric insert;
   wherein the suspension assembly comprises a first assembled configuration corresponding to a first overall length of the shock absorber and extension body in which the axis of the cylindrical body is offset in a first direction relative to the extension body;
   wherein the suspension assembly comprises a second assembled configuration corresponding to a second overall length of the shock absorber and extension body in which the axis of the cylindrical body is offset in a second direction, opposite the first direction, relative to the extension body;
   wherein the eccentric insert comprises an upper shock coupler and a lower shock coupler, and the pin aperture extends through both the upper and lower shock couplers; and
   wherein the upper and lower shock couplers are shaped such that they can only be assembled together in one arrangement relative to one another when the upper and lower shock couplers are assembled to the shock absorber and in contact with the second eyelet of the shock absorber.

2. The bicycle assembly of claim 1, wherein the upper shock coupler comprises a first face and the lower shock coupler comprise a second face, the first face and the second face shaped to be positioned facing one another and to be non-parallel to a plane that is perpendicular to the axis of the cylindrical body when the upper and lower shock couplers are assembled together in the one arrangement relative to one another.

3. The bicycle assembly of claim 2, wherein the first face and the second face are each oriented at an angle to the plane that is perpendicular to the axis of the cylindrical body when the upper and lower shock couplers are assembled together in the one arrangement relative to one another.

4. The bicycle assembly of claim 3, wherein the angle is within a range of 5-45 degrees.

5. The bicycle assembly of claim 3, wherein the angle is within a range of 10-40 degrees.

6. The bicycle assembly of claim 3, wherein the angle is within a range of 15-30 degrees.

7. The bicycle assembly of claim 3, wherein the angle is approximately 22 degrees.

8. The bicycle assembly of claim 1, wherein the axis of the pin aperture is offset from the axis of the cylindrical body by a distance within a range of 2-35 millimeters.

9. The bicycle assembly of claim 1, wherein the axis of the pin aperture is offset from the axis of the cylindrical body by a distance within a range of 5-20 millimeters.

10. The bicycle assembly of claim 1, wherein the axis of the pin aperture is offset from the axis of the cylindrical body by a distance within a range of 2-5 millimeters.

11. The bicycle assembly of claim 1, wherein the axis of the pin aperture is offset from the axis of the cylindrical body by a distance of approximately 10 millimeters.

* * * * *